Figure 1:
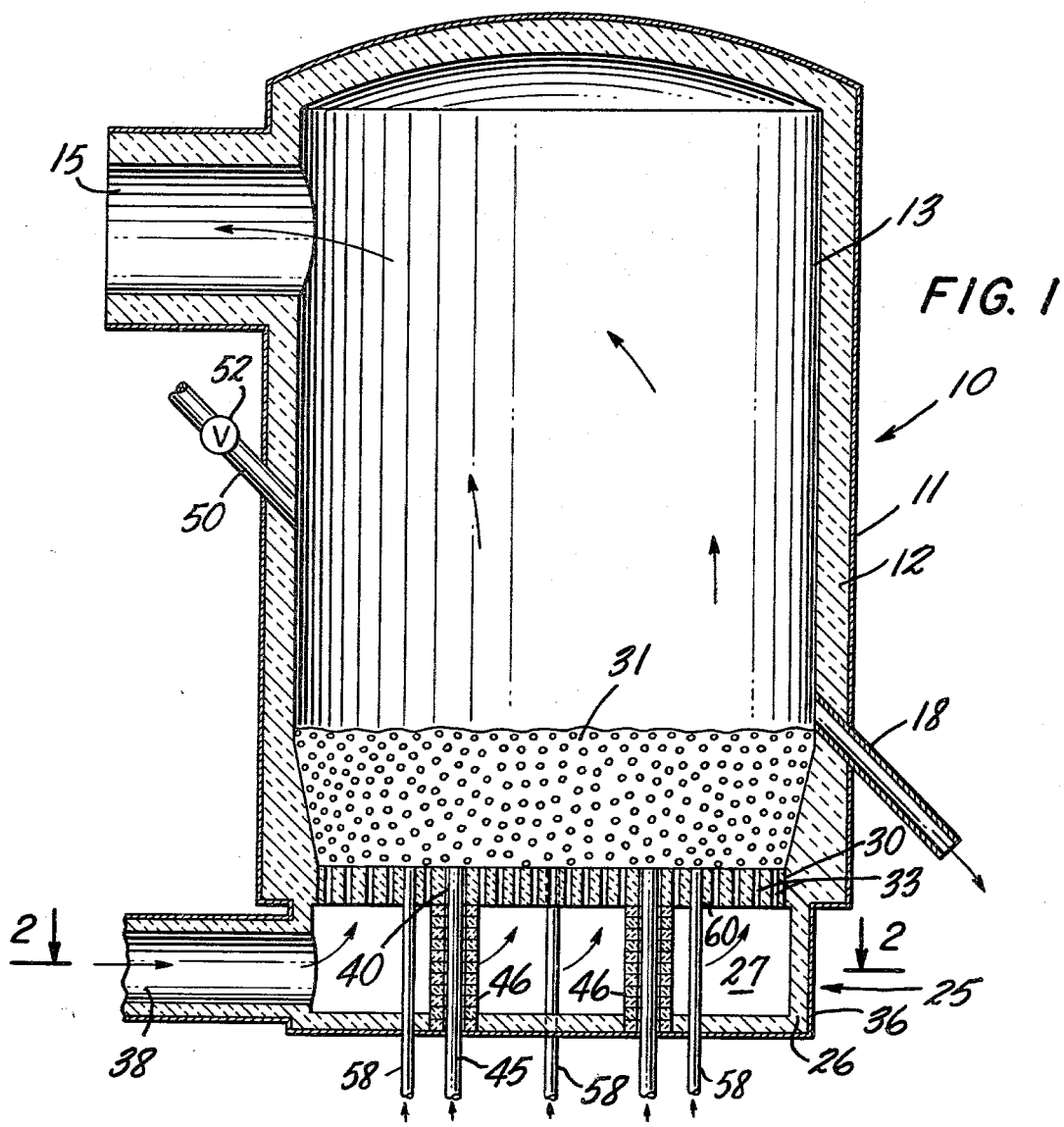

United States Patent [19]

Pyzel

[11] 4,213,938
[45] Jul. 22, 1980

[54] FLUID BED REACTOR

[76] Inventor: Robert Pyzel, 85 E. End Ave., New York, N.Y. 10028

[21] Appl. No.: 671,523

[22] Filed: Mar. 29, 1976

[51] Int. Cl.² .............................. B01J 8/24; B01J 8/44
[52] U.S. Cl. ................................... 422/143; 34/57 A; 432/15; 422/311
[58] Field of Search ................... 23/284, 277 R, 288 S; 34/57 A; 432/15, 58, 234; 110/98; 422/143, 311

[56] References Cited

U.S. PATENT DOCUMENTS

| | | | |
|---|---|---|---|
| 2,595,384 | 5/1962 | Johnson et al. | 422/143 X |
| 3,361,539 | 1/1968 | Pyzel | 23/284 |
| 3,572,662 | 3/1971 | Weaver et al. | 432/234 |
| 3,737,283 | 6/1973 | Nikles | 432/58 |
| 3,782,903 | 1/1974 | Kramer | 23/284 |
| 4,159,305 | 6/1979 | Moorey | 422/143 |

*Primary Examiner*—Michael S. Marcus
*Attorney, Agent, or Firm*—William C. Long; David Dick; Riggs T. Stewart

[57] ABSTRACT

A fluid bed reactor for high temperature operation comprises a perforated grid for supporting the fluidized bed, at least one metal conduit passing through the grid to supply a component of the fluidized bed, and a refractory column freely surrounding the metal conduit, whereby the conduit passes axially through the column, the column extending from a support surface below the grid to the underside of the grid.

1 Claim, 3 Drawing Figures

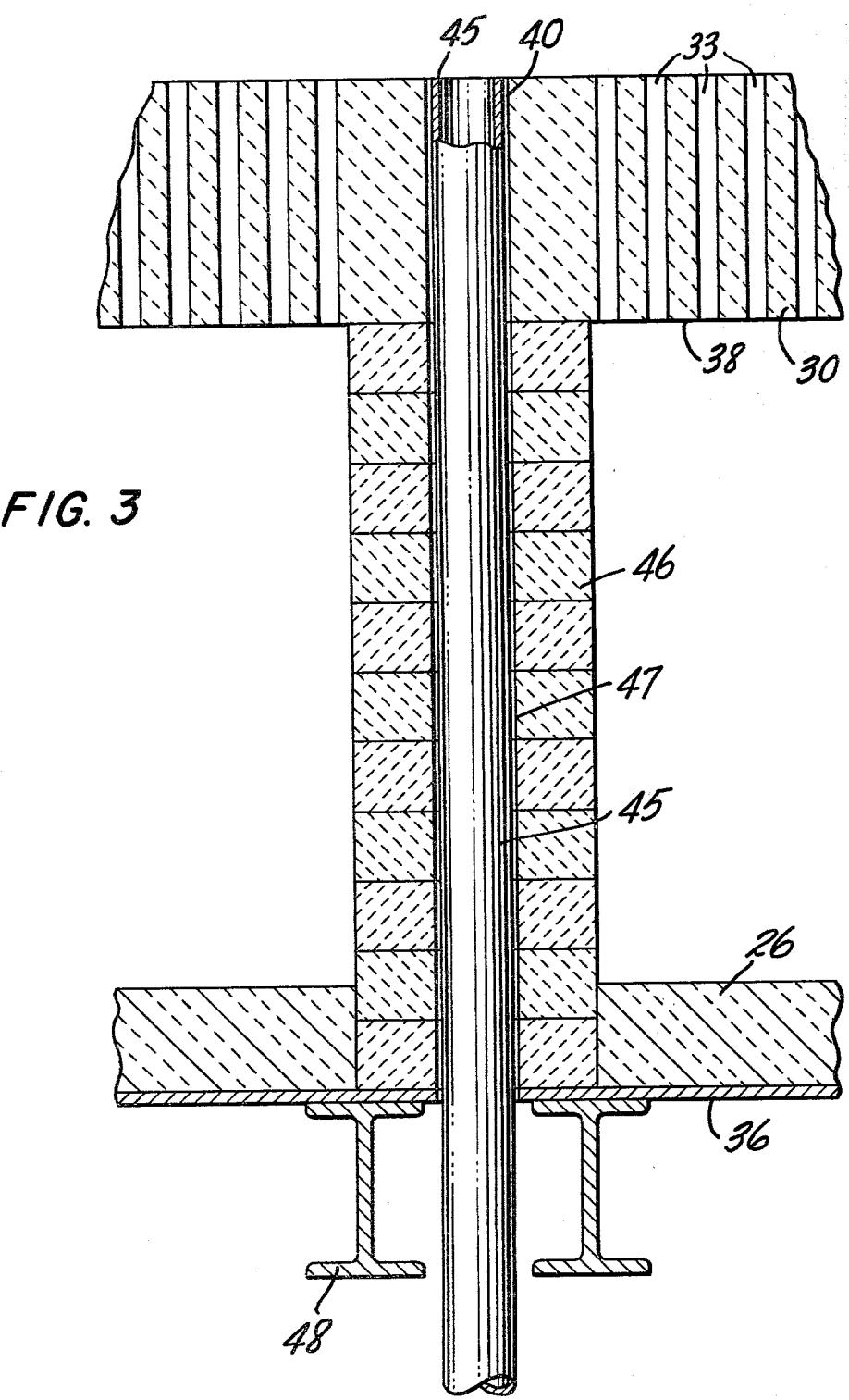

FLUID BED REACTOR

This invention relates to an apparatus for carrying out reactions in a mass of fluidized particles and is more particularly concerned with an apparatus for use in effecting reactions in a fluidized bed wherein the bed is supported by a surface of large area.

In my U.S. Pat. No. 3,361,359, the disclosure of which is incorporated herein by reference, there is disclosed a fluidized solids reactor wherein a fluidized bed is supported by a grid which is of arch form in cross section and is provided with air passages and receives a plurality of pipes for supplying raw material and fuel to the bed as the reaction proceeds. Such a grid is usually made of a ceramic material and the grid may be a single cast unit, especially when used in a small reactor, or it may consist of a plurality of cast ceramic sections or firebricks which are fitted and bonded together in situ to form a grid. The grid disclosed in my patent is of arch form in order to give it strength and is suitably supported along its periphery by the lower part of the reactor. While this construction is fully satisfactory for an apparatus of moderate capacity, a problem arises when a larger reactor is desired, since the area of the supporting grid must then be increased and it becomes overly massive it it is of the arch configuration shown in the patent. It is, of course, possible to decrease the mass of the grid by reducing its thickness, and particularly by making it uniformly of the same reduced thickness. However, when the grid is formed from a ceramic material, a problem of strength is created by such reduction and it becomes necessary to provide support for the grid radially inwardly of its periphery. The grid could be supported at one or more radially inward points by means of a steel structure of appropriate shape. However, such a solution is not satisfactory in practice in view of the high temperatures encountered in some reactions which can be carried out in a fluidized solids reactor of this type, e.g., temperatures in the vicinity of the fluid bed of 2000° F. and higher. Kramer U.S. Pat. No. 3,782,903 shows one attempt to solve this problem by providing ceramic support pillars or columns for the grid. In the operation of an apparatus of this type, however, the grid is subjected to greatly varying conditions. Thus, when the reactor is not in operation, or its operation is temporarily halted, that is, when no fluidizing air or other gaseous medium is charged through the bed of solid particles to maintain them in a fluidized state, the weight which must be supported is not only the weight of the grid itself but also the bulk weight of the mass of solid particles resting on the grid. When, however, the reactor is placed in operation, and the fluidizing gases are passed upwardly through the solid particles at a sufficient rate to cause the mass of particles to become fluidized, then the entire weight of the mass of fluidized particles is supported by the fluidizing gases, so that the grid carries no weight and even its own weight is partially offset by the pressure drop through the grip as the fluidizing gases pass through the perforations in the grid. Moreover, when the reactor is in operation, there are large volumes of gases passing into the reactor to supply the reaction taking place with fuel, air and raw materials and to fluidize the bed. As a result, the fluidized bed is in violent agitation and there is a tendency for the grid and the entire reactor to vibrate and in some cases there is even a net upward force on the grid, so that the grid may even by lifted slightly during the course of operation. Thus, when the reactor is in operation, there is practically no weight bearing down on the supporting columns, while when the reactor is started or is shut down with the mass of particles resting on the grid, the columns become fully loaded with the combined weight of the grid and the bulk weight of the non-fluidized mass of particles supported on the grid. These sharply contrasting states are further aggravated by the large difference in the operating and non-operating temperature conditions in the reactor. As a result, the stability and solidity of each column is adversely affected. In addition, there is the added problem of the displacing forces and excessive fluttering vibrations to which the columns may be subjected because they are standing in a plenum chamber in which the turbulence and the velocities of the fluidizing gases flowing through this chamber are of hurricane proportions, while the reactor itself is subject to shaking and vibration resulting from the agitation of the very large active mass of the fluid bed. The support columns tend to become displaced and to lose their effectiveness and thus the entire structural integrity of the grid is jeopardized.

It is accordingly an object of the present invention to provide an improved fluid bed reactor.

It is a further object of the invention to provide a reactor of the character indicated having an improved grid support means.

It is another object of the invention to provide a fluid bed reactor having a grid support means which can effectively withstand varying reactor conditions and permits the construction of improved reactors of the type requiring grid supports.

Figure 2:
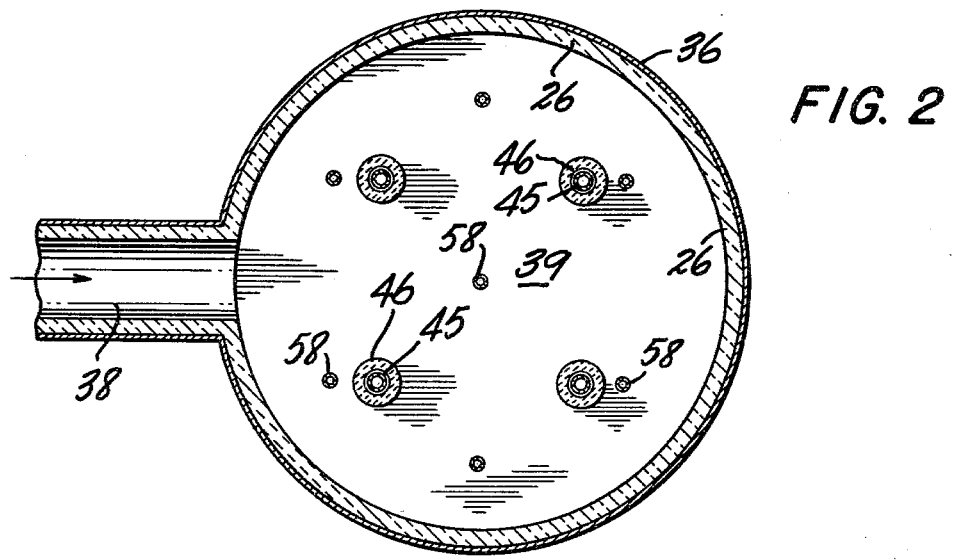

Other objects and features of the invention will become apparent from the following description of the invention taken in combination with the accompanying drawings wherein, FIG. 1 is a vertical cross-sectional view of a reactor embodying features of the invention;

FIG. 2 is a horizontal cross-sectional view of the reactor taken approximately along the line 2—2 of FIG. 1; and FIG. 3 is an enlarged vertical cross-sectional view of a portion of FIG. 1 showing details of the grid-supporting construction of the invention.

In accordance with the invention, there is provided a fluidized solids reactor of the character described, wherein the fluid bed-supporting refractory grid is supported radially inwardly of its periphery at one or more points by annular ceramic columns, suitably formed from refractory "blocks" which are piled upon one another to form the columns, reaching through the "plenum" chamber from the bottom of the reactor to the under surface of the grid and which surround at least some of the metallic conduits which supply fluids, either liquid or gaseous, and which can also carry entrained solids to the upper surface of the grid, each of such conduits being connected to a suitable source of the material which flows through it during the operation of the reactor. Since such fluids, liquid or gaseous, are relatively cool, compared to the temperature of the fluidized bed, their passage through the metal conduits cools the conduits notwithstanding the high temperatures existing in the fluidized bed and in the plenum chamber when the fluidizing gases are preheated, and the conduits serve to stabilize the annular columns which surround them against displacement so that vibrations of the grid and net upward forces upon the grid which tend to lift it have no adverse effect upon the structural integrity of the columns formed from the annular ceramic blocks which surround the conduits. The annular columns are formed so that there is a sufficient clearance between their inner surfaces and the outer surfaces of the conduits which they surround so that they are not affected by the thermal expansion of the conduits. As a result, there is provided a fully effective solution to the problem of supporting large-area grids in fluid-bed reactors adapted to operate at elevated temperatures.

Aside from the effective solution of the problems referred to above, another important advantage and feature of the construction of my invention is that the feed materials or fuel flowing upwardly through the inlet pipes are protected from the high temperatures which may be found in the fluidizing gases charged into the plenum chamber, since the columns act as insulators because of the relatively low heat conductivity of the ceramic or refractory material, and this prevents clogging of the inlet pipes when processing feed material or using fuel which becomes adhesive when heated.

Referring now to the drawings, and particularly to FIG. 1, the embodiment illustrated comprises a vessel 10 having a metallic shell 11 with a refractory lining 12. The main body portion 13 of the vessel is suitably of cylindrical form disposed on a vertical axis and is provided with an upper outlet 15. The body portion 13 is provided with a product discharge outlet 18 in the form of a tube mounted in an opening in the shell and in a passage through the lining leading inward from the opening. If necessary, the outlet may be water-cooled to protect it against excessive heat. At its lower end, the vessel has a downwardly-extending portion 25, suitably cylindrical, which defines a plenum chamber 27.

The bottom of the body portion 13 is closed by a grid 30 which is adapted to support the bed 31 of fluidized material and, as previously indicated, is formed from ceramic material, preferably of high temperature refractory. While the grid 30 may be cast as a single integral unit, it can be formed from a plurality of sections which are fitted and bonded together in conventional manner to define the complete grid. The grid 30, which is of substantially uniform thickness, as distinguished from the arch form shown in U.S. Pat. No. 3,361,359, is particularly adapted for use in reactors where a large grid is desired, i.e., a grid having a surface area of at least about 250 sq. ft., but it can, of course, be used in the case of smaller reactors, if desired. In any case, while the grid can be circular in horizontal cross-section, it may be rectangular or of any other shape to conform to the interior cross-sectional space defined by the vessel body portion 13. The grid can be supported at its periphery, if desired, e.g., by the wall of the body portion 13 or the wall of plenum chamber, e.g., as shown in U.S. Pat. No. 3,782,903, but ordinarily the radially-inwardly disposed supports in accordance with this invention are sufficient. The grid 30 is formed with a plurality of closely-spaced air passages 33 which may, if desired, have the form of the air passages shown in U.S. Pat. No. 3,361,359. The grid 30 is also provided with a plurality of openings for reception of metal conduits, as will be described as this description proceeds. The plenum chamber 27 which is defined by refractory lining 26, which is an extension of the lining 12, and a surrounding metallic shell 36, which is an extension of shell 11, is provided with an inlet 38 adjacent its lower surface which is adapted to be connected to a source (not shown) of air or other fluidizing gas. Extending through suitable openings in the lower surface 39 of chamber 27, and also extending through the openings 40 in grid 30, are a plurality of metallic raw material feed pipes or conduits 45 which are adapted to be connected to a source (not shown) of raw material which is suitably conveyed through the conduits and into body portion 13 by a fluid which may be gaseous or liquid and, as previously mentioned, is relatively cool.

Referring now to FIGS. 2 and 3, each conduit 45 is surrounded by a column of annular refractory units or bricks 46. Each column extends from shell 36 through lining 26 to the lower surface 38 of grid 30. These bricks are of annular form so that they enclose the conduit 45 which they surround with a small clearance 47 sufficiently great that the conduit can move freely in response to expansion and contraction forces brought about by temperature changes. While the bricks are shown in FIG. 2 as having a cylindrical outer periphery, the outer periphery may have a rectangular cross-section or may have a cross-section of some other shape as long as it has a suitable bore to enclose freely the conduit 45 with which it is associated. Furthermore, each brick may be integrally formed or it may be made up of a plurality of sections. Suitably, the bottom of the plenum chamber rests upon a plurality of beams 48 which may be part of the reactor support at the desired elevation, the beams advantageously being disposed below each column of units 46.

The number of feed conduits employed depends on the diameter of the reactor and, with a reactor of small diameter, a single feed conduit disposed at the center of the grid may be used. The reactor shown is provided with four feed pipes, which is a suitable number for a reactor of medium size, such as 100 to 200 sq. ft. and the conduits are equi-angularly spaced with one in each quadrant of the grid area. In all instances, the feed conduits are disposed in the central area of the grid and lie a substantial distance, at least 3 feet, from the reactor wall. The fluidized mass is established on the grid at the start of the operation of the reactor by charging the fluidized mass particles through the inlet pipe 50, extending through the wall of the reactor and provided with a control device 52.

The fuel is introduced into the bed through a plurality of pipes 58 which extend through the shell and through the chamber 27 into and through openings 60 in the grid. In order that all parts of the bed may be properly supplied with fuel, a relatively large number of fuel pipes is provided, the number depending on the diameter of the reactor, and the kind of fuel used. Thus a reactor fired with gas as fuel should have at least one fuel pipe for each 8 to 20 sq. ft. of reactor cross-sectional area, while a reactor fired with oil requires a lesser number of fuel pipes and at least one pipe for each 15 to 30 sq. ft. of reactor cross-section is ordinarily adequate. When pulverized solid fuels, such as coal or coke, are used, the number of fuel injection points may be further reduced, probably because the solid fuel particles become attracted to and part of the fluidized mass and churn about therein while burning. When the feed material and the fuel are both finely divided solids, it may be convenient to combine the fuel and feed materials and inject the mixture at a number of points. Such an arrangement requires more injection points for the mixture than would be required for injection of the feed alone, but it makes possible the elimination of all or nearly all separate fuel pipes, and the feed pipes 45 may serve for supplying both feed and fuel so that the equipment for injecting the feed may serve to inject the pulverized fuel as well.

It will be understood that while the columns supporting the grid and suitably formed from annular bricks 46 most advantageously surround the feed pipes, it is also possible to provide them around the fuel pipes instead or to have them surround both feed pipes and fuel pipes when both types of pipes are provided. It will, of course, be understood that the bricks forming the columns must be of sufficient strength to support the grid during operation of the reactor but also to support the static load imposed by the grid and the fluid bed which will rest upon it when the fluidizing flow is shut down. Providing the necessary strength will be readily apparent to persons skilled in the art. Moreover, the number and arrangement of such columns will depend upon the area of the grid and the weight of the grid and the fluid bed under rest conditions, as will be obvious to persons skilled in the art. In a preferred form of the invention, each feed conduit is provided with a column.

In the operation of the reactor, preheated air or other gas is supplied to plenum chamber 27 through inlet 38 and the particles which are to form the fluidized mass are charged through the pipe 50. The gas, which may during operation be preheated by heat derived by heat exchange from the exhaust gases leaving the reactor, or in other ways, fluidizes the bed formed above the grid and, when the mass reaches fuel ignition temperature, fuel is charged into the mass through the fuel pipes 58 and the fuel supply is gradually increased as the mass becomes incandescent. When the desired reaction temperature has been reached, feed material is charged into the mass through the feed conduits 45.

It will be understood that various changes and modifications may be made in the embodiments described above and it is intended, therefore, that all matter contained in the foregoing description and illustrated in the drawing shall be interpreted as illustrative only and not as limitative of the invention.

I claim:

1. An apparatus for carrying out reactions in a body of fluidized particles which comprises a vessel having sidewalls and a bottom and a gas outlet at its upper end, a perforated non-metallic grid extending between said sidewalls and separating said vessel into an upper portion defining a reaction chamber adapted to contain the fluidized bed above said grid and a lower plenum chamber below said grid for reception of an air stream for passage through said grid into said fluidized bed, means defining an inlet for said air stream in said plenum chamber, a plurality of refractory columns extending between the bottom of said vessel and the lower surface of said grid, said columns serving to support said grid radially inwardly of its periphery when said bed is at rest but said grid being susceptible of movement out of contact with said columns when air streams pass into said chamber and flow upwardly through said grid to fluidize said fluid bed at elevated temperatures, each of said columns having an internal axial bore and being defined by vertically superposed annular segments, at least one set of metallic conduit means for supplying fuel and reactant to said fluidized bed, at least some of the conduits passing axially through said bores in said refractory columns with sufficient clearance that the conduits can move freely in said bores in response to expansion and contraction forces brought about by temperature changes, said conduits thereby providing means for supplying reactants and fuel to the fluidized bed and simultaneously stabilizing the columns against displacement under reaction conditions.

* * * * *